Sept. 1, 1970  E. BERNER  3,526,556
APPARATUS AND METHOD FOR THE CONTINUOUS PRODUCTION OF
SLABS OR SHEETS COMPOSED OF FOAMED POLYMERIC
MATERIAL HAVING A CELLULAR CORE
Filed Dec. 6, 1966  3 Sheets-Sheet 1
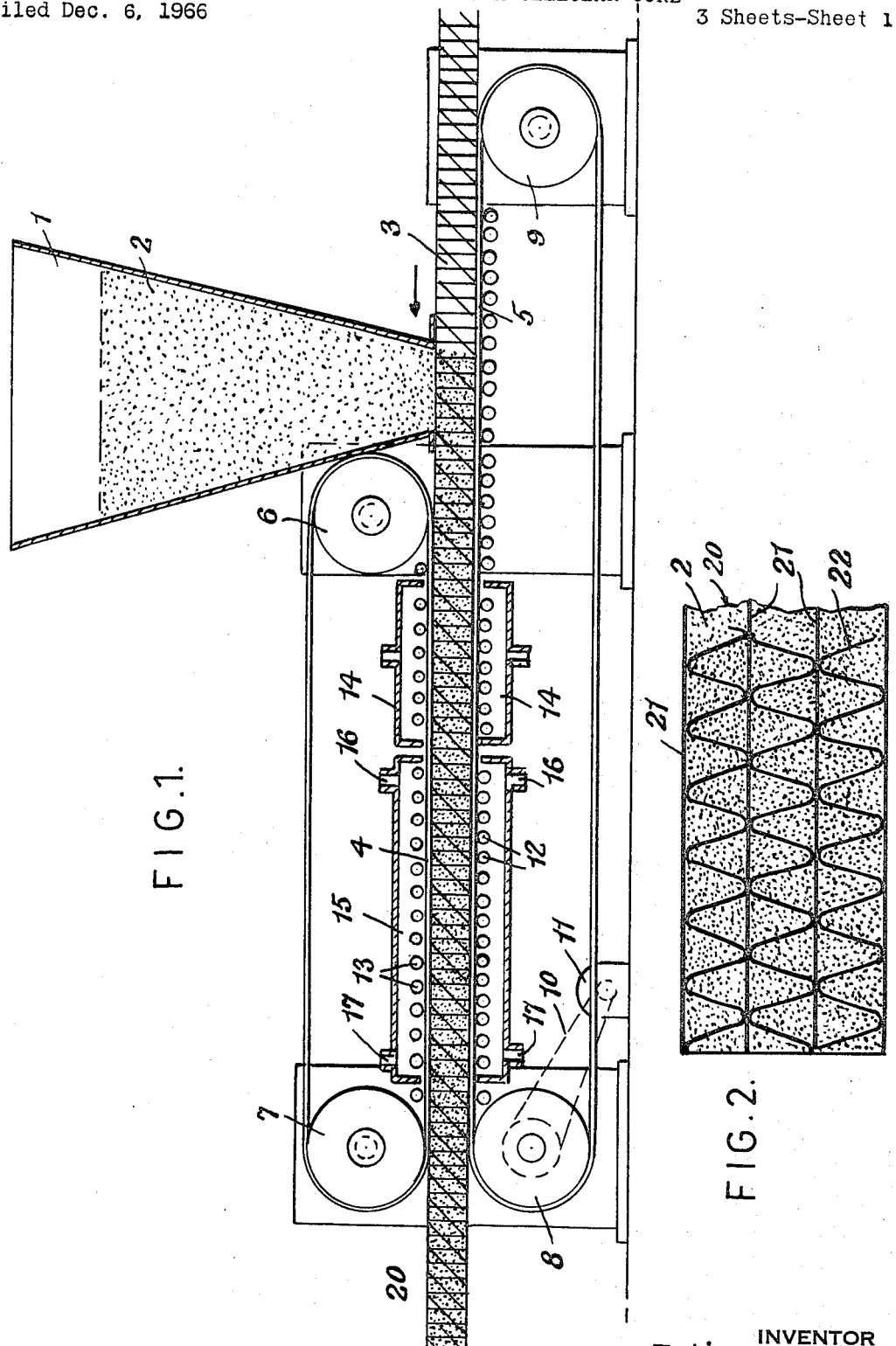
INVENTOR
Erling Berner
BY
ATTORNEY

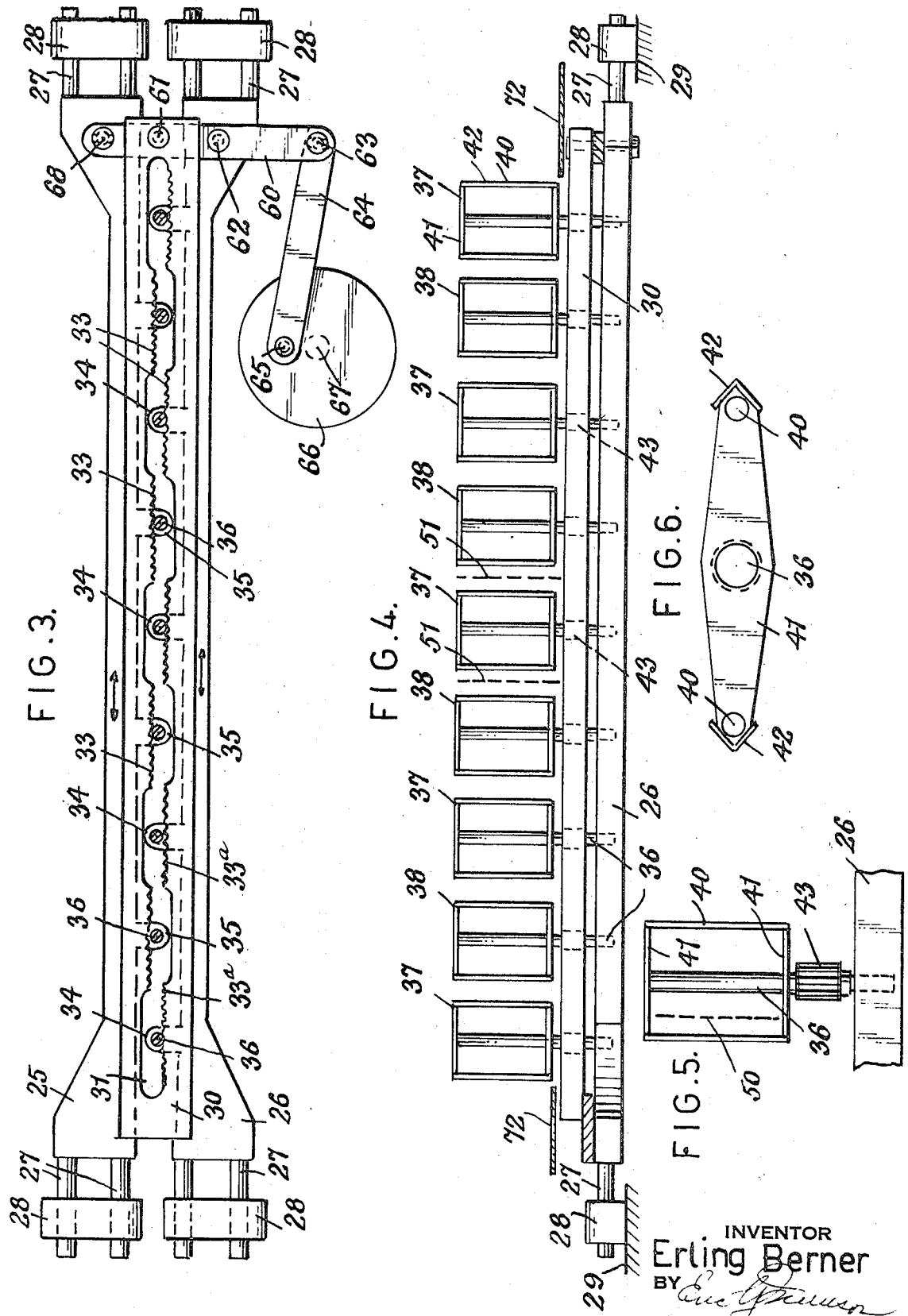

Sept. 1, 1970           E. BERNER           3,526,556

APPARATUS AND METHOD FOR THE CONTINUOUS PRODUCTION OF
SLABS OR SHEETS COMPOSED OF FOAMED POLYMERIC
MATERIAL HAVING A CELLULAR CORE

Filed Dec. 6, 1966           3 Sheets-Sheet 3

INVENTOR
Erling Berner
BY
ATTORNEY

United States Patent Office 3,526,556
Patented Sept. 1, 1970

3,526,556
APPARATUS AND METHOD FOR THE CONTINUOUS PRODUCTION OF SLABS OR SHEETS COMPOSED OF FOAMED POLYMERIC MATERIAL HAVING A CELLULAR CORE
Erling Berner, New Castle, Pa., assignor to Berner Industries, Inc., New Castle, Pa., a corporation of Pennsylvania
Filed Dec. 6, 1966, Ser. No. 599,456
Int. Cl. B31f 1/00; B32b 5/18
U.S. Cl. 156—79   7 Claims

ABSTRACT OF THE DISCLOSURE

A method and apparatus for producing cellular or corrugated sheets containing plastic in its cells comprising forming a corrugated sheet and applying intermediate and/or facing sheets thereover; depositing plastic beads or a foaming plastic mixture in the cells or corrugations and then expanding the beads therein by the application of heat and then cooling the sheet or allowing the plastic mixture to foam through chemical reaction.

---

This invention relates to an apparatus and method for the continuous production of slabs or sheets composed of synthetic thermoplastic granules containing a heat expandable agent of the polymeric type, and to the production of a slab or sheet of this kind which contains a cellular or honeycomb type of reinforcement, the cells of which are filled with the thermoplastic material.

The invention also relates to means for producing the cellular reinforcement; feeding the same into the slab or sheet-producing apparatus and filling the cells of the cellular reinforcement with the plastic granules and then subjecting the sheet to expansion of the granules.

It is an object of the invention to provide means for continuously producing a sheet or slab as above stated, having a paper core, preferably impregnated with phenols or similar resins, and with the core filled with polystyrene or polyurethane foam. This results in a stiffened board or sheet having very good insulating characteristics and possessing many advantageous uses.

Means for spraying a sufficient amount of foamable chemical composition into the cells of the cellular body to fill said cells during the foaming process may be included in the apparatus.

More particularly, the invention contemplates the provision of an apparatus and method by which a cellular reinforcing core is provided by feeding strips of an edge to corrugating elements which by their rotative action, form corrugations in the strips, or form such strips into sinuous formation and adherently attach the corrugated strips at their apices to non-corrugated intervening paper strips or similar sheet material. The cellular structure thus formed is fed to position below a hopper from which the expansible granules are fed into the cells of the core and the resultant combination of granules and the cellular core is then fed to heating means and then to cooling means, emerging as a reinforced board or slab.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is an elevational view, with some parts in section, of an apparatus for the continuous production of the honeycomb-reinforced board or slab;

FIG. 2 is a sectional view of the slab;

FIG. 3 is a top plan view of the mechanism for producing the cellular reinforcing core;

FIG. 4 is a side elevation of the same;

FIG. 5 shows one of the corrugating frames or blades;

FIG. 6 is an enlarged top view of the blade or frame shown in FIG. 5;

Figure 7:
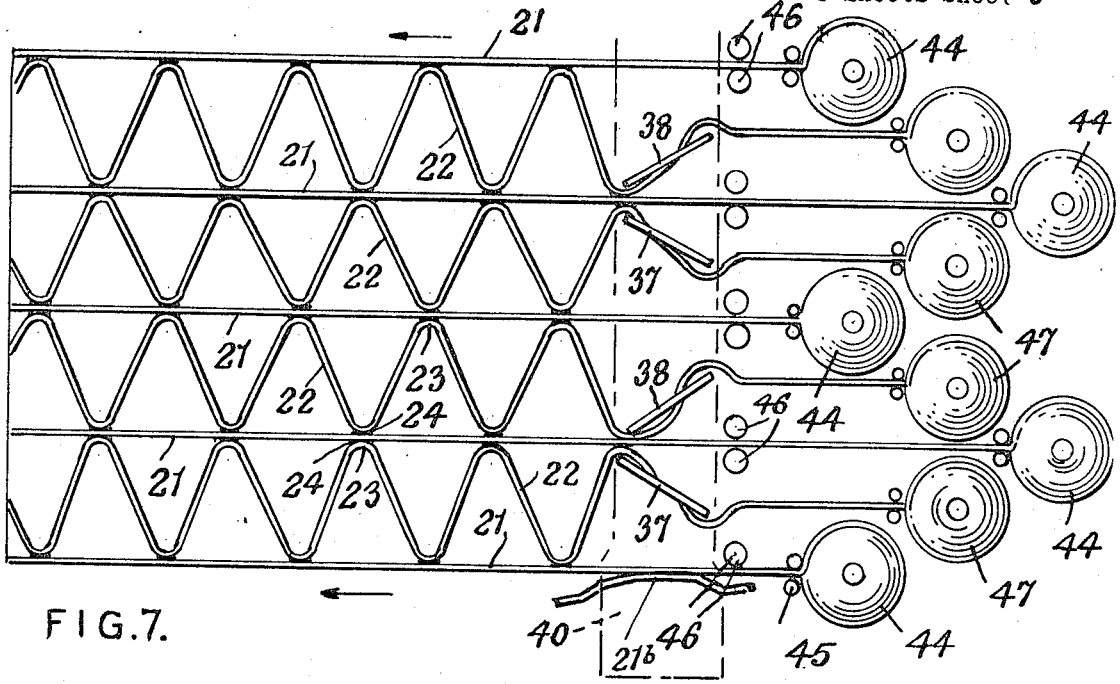
FIG. 7 is a diagrammatic view showing the feeding of the paper strips which produce the cellular core and the action of the corrugating blades on the strips, and FIGS. 8 to 11 diagrammatically show the action of the blades on the paper strips to form the required corrugations therein.

Referring to the drawings, and more particular to FIG. 1 thereof, the apparatus therein disclosed includes a hopper 1 from which the polymeric granules 2 are supplied by suitable feeding means if necessary, and not disclosed, into the cells of a honeycomb or cellular paper core 3 that is moved in the direction of the arrow between perforated, stainless steel bands or belts shown respectively at 4 and 5. Both or one of these belts can be positively driven. The upper belt 4 extends about the drums 6 and 7 and the lower belt 5 is borne by the drums 8 and 9. The drum 8 is driven by chain or belt 10 from a variable speed motor 11. Rollers 12 support the lower belt 5 and similar rollers 13 are disposed above the upper belt 4.

After the polymeric beads or granules are fed from the hopper 1 into the honeycomb or cellular material 3 during the passage of such material under the hopper, the plastic material and its core are then borne between the belts or bands 4 and 5 through steam chests 14 wherein, by the application of heat from the steam, diffused through perforations in the belts, the plastic granules are heated and expanded in the known manner. The granules, thus expanded and agglutinized into a coherent body with the cellular core embedded, then enter the cooling zone 15 of a length greater than the length of the heating zone 14. The cooling agent in the chests 15 may be air and it is introduced into the chests 15 through inlets 16 and escapes through the outlets 17. The cooling can also be obtained by using vacuum in the cooling section. The water contained in the beads will evaporate and thereby cool the board. The finished reinforced board or slab 20, a portion of which is shown in FIG. 2, passes from between the belts to any suitable means by which it is cut into required lengths or is otherwise handled or treated.

The honeycomb or cellular material which forms the corrugated core of the board consists of spaced, parallel non-corrugated sheets or strips of paper 21, preferably impregnated with phenols or similar resins, and between which are arranged sinuous or corrugated strips 22 of similar material. The corrugated strips 22 are secured at their apices (FIG. 7) by adhesive 24 to the straight, non-corrugated strips 21 with the apices 23 of each of the strips 22 opposite to the apices of adjacent strips. The strips 21 and 22 which form the cellular core or honeycomb may be of any suitable width such as 100 mm. for example, according to the thickness of the board which the core is to reinforce.

The mechanism 70 for forming the reinforcing core is disclosed in FIGS. 3 to 6. Therein is shown a pair of spaced reciprocating slide bars 25 and 26 provided with guide rods 27 at their opposite ends, said rods being slidable through guide blocks 28 mounted upon a fixed base member 29. Fixedly mounted above the bar 25 and 26, is a rack 30 provided with a longitudinal slot 31. The slide bars 25 and 26 are reciprocated as indicated by the arrows in FIG. 3, by means of a lever 60 pivoted at 61 at one end of the fixed rack 30. One end of the lever 60 is pivotally connected at 68 to the bare 25, the lever being pivoted at 62 to the bar 26. The second end of the lever 60 is pivoted at 63 to one end of a link 64 having its opposite end pivoted at 65 to an eccentric 66 having its shaft 67 driven from an electric motor not shown.

This arrangement is such that the two slide bars 25 and 26 are reciprocated in opposite directions.

One edge of the slot 31 in the rack 30 is formed with spaced groups of teeth 33, while the opposite edge of the slot is formed with the groups of teeth indicated at 33a. Formed on the reciprocating bar 26 are spaced lugs 34, and similar lugs 35 project from the slide bar 25. Rotatably mounted in each of the lugs is a spindle 36 on which is mounted a frame or strip-corrugating blade. The blades carried by the spindles in the lugs 34 are indicated at 37 while those carried on the spindles in the lugs 35 are indicated at 38. Since the bars 25 and 26 are reciprocated in opposite directions due to the connection of the lever 60 with them, the spindles carrying the blades 37 will be rotated in one direction, while the blades 38 will rotate in the opposite direction, for about 180 degrees.

Each of the frames or blades 37, 38 consists of a rectangular frame composed of parallel side pieces 40 connected at the top and bottom by cross pieces 41. The vertical side pieces 40 having angular outer edges 42 as seen in FIG. 6. The frame or corrugating blade as above described is fixed on the spindle 36 and the spindles each carry a pinion 43 for meshed engagement with one of the groups of teeth 33 or 33a as clearly seen in FIG. 3.

The feed of the strips 21 and 22 which make up the cellular core, is shown in detail in FIG. 7. It will be therein seen that the straight strips 21 are drawn from supply rolls 44 guided between feed rolls 45, and also between gluing rollers 46, by which latter rollers spaced glue spots are applied, at required intervals, on the opposite faces of the strips 21 to thereby provide for the adhesive adherence of the apices 23 to the strips 21 as indicated in FIG. 7.

The strips 22 which form the corrugated or sinuous elements of the cellular core are drawn from supply rolls 47 and are moved on edge along support 72 between the straight strips 21. These strips 21 as well as the strips 22 are fed on edge, the strips 22 being fed at greater speed than the strips 21 in order to provide the required slack to allow the strips 22 to be formed into corrugations. Strips 22 are threaded through the frames or blades 37, 38 as clearly shown in FIG. 7 and as indicated in dotted lines at 50 in FIG. 5. The straight and non-corrugated strips 21 pass between the blades or frames 37, 38, one of the strips being indicated in dotted lines at 51 in FIG. 4.

Figure 8:
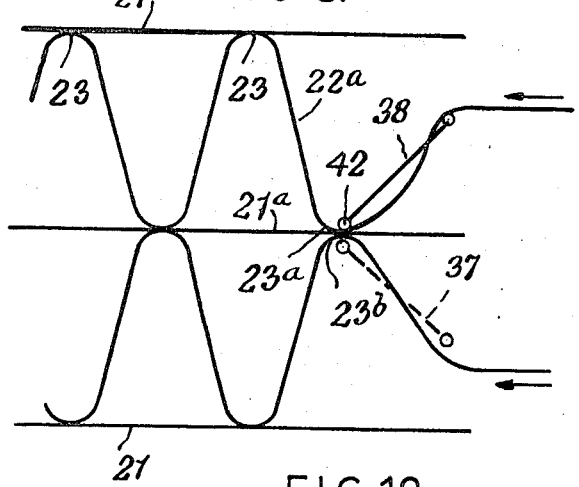

The manner in which the frames or blades 37, 38 are effective to form the corrugations in the cellular core will be apparent from FIGS. 7 to 11 inclusive. In FIG. 8, one of the blades has been rotated about its vertical axis to bring its edge 42 against the strip 22a and to force the apex 23a against the straight sheet 21a. At the same time, the opposite blade 38 has by its rotating movement, similarly formed the apex 23b against which the opposite face of the strip 21a bears at a point directly opposite to the point of contact of the apex 23a with the sheet 21a, so that as a result, the two blades 37, 38 exert pressure between them to firmly press the apices 23a and 23b against the respective opposite faces of the strip 21a over the glue spots thereon and secure the adhesive attachment of the apices to said sheet 21a. The parts in the above-described position are shown in FIG. 7.

Figure 9:
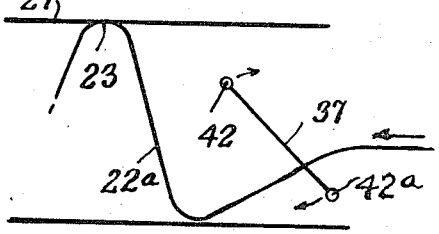
Figure 10:
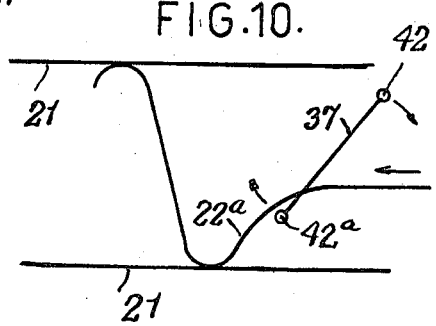
Figure 11:
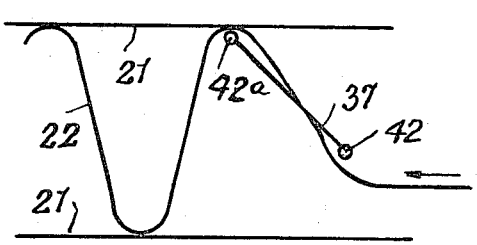

In FIG. 9 the end of the blade 37 is shown as moving to bring the strip 22a around into the formation of the next apex. FIG. 10 shows the end 42a of the blade 37 about to engage the strip 22a and FIG. 11 shows an apex formed and pressed against one of the straight strips 21. When the cellular body or honeycomb structure is formed as shown at the left in FIG. 7, the same progresses into the apparatus of FIG. 1 and the cells in the honeycomb reinforcement are filled with the granules as heretofore described.

While I have herein described the cellular reinforcement as consisting of a plurality of uncorrugated sheets with corrugated or sinuous sheets or strips interposed between them it will be apparent that only corrugated sheets might well be used. In such case, an adhesive can be applied to the corrugated strips at their apex points so that the strips will adhere together at such points when pressed together.

In FIG. 7 a spring is shown at 21b, such springs being used at each side of the honeycomb slab if required in order to press the sheets 21 against the sheets 22 when the part 42 carried by spindle 36 brings the corrugated paper 22 into contact with the flat sheet 21.

What I claim is:

1. A method for manufacturing a cellular core for a plastic body comprising, feeding a plurality of spaced; parallel straight strips, feeding corrugation-forming strips between the straight strips at a greater rate of speed than the rate of speed of the straight strips, rendering the faces of the straight strips adhesive at spaced localities, forming the corrugation-forming strips into sinuous shape between the straight strips and pressing the apices of the corrugated strips between the adhesive faces of the straight strips by means of rotative frames which produce the corrugations.

2. A method according to claim 1 which includes spraying a sufficient amount of a foamable chemical composition into the cells of the cellular body to fill said cells during the foaming process.

3. A method according to claim 1, including filling the cells of the cellular body from one end thereof with a foamable plastic material.

4. An apparatus for manufacturing a plastic sheet or board comprising, means for corrugating a plurality of strips of sheet material and adhesively uniting the strips to form them into a cellular structure, said corrugating means including vertically arranged rotative blades, means for feeding expandable plastic material, means for moving the cellular structure into position to receive the expandable plastic material from said feeding means and depositing the same into the cells from one end of the cells to thereby fill the cells of the cellular structure, heating and cooling means for the plastic-filled cellular structure, and means for feeding said strips on edge.

5. An apparatus for manufacturing sheet material, according to claim 4, including a hopper from which expandable plastic material is delivered and from which the material is deposited into the cells from one end of the same, a belt on which the cellular structure is carried to deliver it to a position for the reception of the plastic material into its cells at one end thereof from the hopper, with the heating and cooling means arranged along the line of travel of the belt to thereby expand the plastic material carried within the cells.

6. An apparatus for manufacturing a cellular body comprising, means for feeding a plurality of first strips of sheet material in spaced relation, means for feeding intermediate strips at a greater rate of speed between the first strips, a plurality of upstanding rotative frames between which the first strips are fed and through which the intermediate strips pass, means for rendering spaced areas of the faces of the first strips adhesive, means for rotating the frames to cause the same to fold the intermediate strips into sinuous formation and to bring the apices of said folded strips into contact with the adhesive areas of the first strips, and means by which each two of the frames will oppose one another in their rotative movement to cause each of them to press an apex against each side of one of the first strips to thereby adhesively attach such apices to the faces of the strip that is located between them.

7. In an apparatus according to claim 6, wherein the frames are alternately rotated in opposite directions, a pinion-bearing spindle on which each of the frames is mounted, a toothed rack engaging the pinions on the spindles, slide bars movable in opposite directions, one of said slide bars carrying some of the spindles and the other slide bar carrying the remaining spindles.

References Cited

UNITED STATES PATENTS

| | | | |
|---|---|---|---|
| 2,475,789 | 7/1949 | Kunz | 156—260 |
| 2,759,523 | 8/1956 | Goldstein et al. | 156—207 XR |
| 2,973,295 | 2/1961 | Rodgers | 161—190 XR |
| 3,010,508 | 11/1961 | Wilson et al. | 156—210 XR |
| 3,180,778 | 4/1965 | Rinderspacher et al. | 156—311 |
| 3,262,834 | 7/1966 | Abell et al. | 161—159 |
| 3,264,153 | 8/1966 | Rodman et al. | 156—79 |
| 3,274,668 | 9/1966 | Horst | 29—631 |

JOHN T. GOOLKASIAN, Primary Examiner

H. F. EPSTEIN, Assistant Examiner

U.S. Cl. X.R.

156—78, 205, 470, 585; 161—161, 133, 135